G. E. CLEVELAND.
MACHINE FOR MAKING ARTICLES OF GLASS.
APPLICATION FILED OCT. 4, 1909.

987,671.

Patented Mar. 21, 1911.

WITNESSES:

INVENTOR
GEORGE E. CLEVELAND,
BY
ATTORNEY

G. E. CLEVELAND.
MACHINE FOR MAKING ARTICLES OF GLASS.
APPLICATION FILED OCT. 4, 1909.

987,671.

Patented Mar. 21, 1911.
7 SHEETS—SHEET 2.

Fig. 2.

WITNESSES:
Ethel L. Lister

INVENTOR
GEORGE E. CLEVELAND
BY Thomas L. Ryan
ATTORNEY

G. E. CLEVELAND.
MACHINE FOR MAKING ARTICLES OF GLASS.
APPLICATION FILED OCT. 4, 1909.

987,671.

Patented Mar. 21, 1911.
7 SHEETS—SHEET 4.

WITNESSES:

INVENTOR
GEORGE E. CLEVELAND
BY
ATTORNEY

G. E. CLEVELAND.
MACHINE FOR MAKING ARTICLES OF GLASS.
APPLICATION FILED OCT. 4, 1909.

987,671.

Patented Mar. 21, 1911.

WITNESSES:
Ethel L. Lister

INVENTOR
GEORGE E. CLEVELAND
By Thomas L. Ryan
ATTORNEY

UNITED STATES PATENT OFFICE.

GEORGE E. CLEVELAND, OF FAIRMOUNT, INDIANA, ASSIGNOR, BY MESNE ASSIGNMENTS, TO CLEVELAND MACHINE COMPANY, OF MARION, INDIANA.

MACHINE FOR MAKING ARTICLES OF GLASS.

987,671.

Specification of Letters Patent. Patented Mar. 21, 1911.

Application filed October 4, 1909. Serial No. 520,917.

*To all whom it may concern:*

Be it known that I, GEORGE E. CLEVELAND, a citizen of the United States, and a resident of Fairmount, in the county of Grant and State of Indiana, have invented a new and useful Machine for Making Articles of Glass, of which invention the following is a specification.

This invention relates to machines for the making of articles of glass.

The objects of my invention are to provide a machine of this character whereby a severance and delivery of the glass into the mold and then the rapid and accurate formation of the glass article either in pressed ware solely, or blown ware, may be accomplished.

To these ends my invention consists of the new construction, combination and arrangement of parts composing my improved machine, described in this specification, illustrated in the accompanying drawings, and clearly defined in the appended claims.

The preferred general form, proportion and arrangement of the parts composing this machine is that shown in this description and illustration of my invention.

It will be understood of course that minor changes might be made in the form and arrangement and detailing of this machine, within the scope of the appended claims, without departing from the nature or spirit of my invention in the least, or sacrificing any of its advantages.

Corresponding parts of the machine, are indicated by similar characters of reference throughout the several views, in the drawings in which—

Fig. 8 is a transverse sectional view of the lower portion of the machine taken on the line 8 in Fig. 2 and viewed in the direction indicated by the arrow in Fig. 2. Fig. 9 is a transverse sectional view of the lower portion of the machine taken on the line 9 in Fig. 1, and viewed in the direction indicated by the arrow in Fig. 1. Fig. 15 is a detached enlarged side view.

The supporting frame for my improved machine is composed of the frame plate 1 which has its sides bolted securely to the side members 2, and which side members are carried on suitable axle bars 3 and 4 having bearings in the wheels 5. The support ring 6 formed integral with the frame plate forms the base for the column 7, the bottom of which column is provided with a flange that rests on and is bolted securely to the flanged top of the support ring, as plainly shown in Fig. 4. The cylindrical central portion 8 of the carrier table 9 surrounds the said support ring 6, and in its bottom is provided a ball race which will register with a similar race on the frame plate 1, and between which races are the balls 10, so that the carrier table is free to move rotatively.

The press molds 11 are supported in the suitable mold stands 12 carried by the carrier table 9. My improved machine is capable of being operated for the production of blown ware, as well as that of pressed ware. In this specification of my invention I have shown the carrier table rigged with the press molds only. When blown ware is to be produced, blow molds 13 will be carried by the carrier table at locations alternating with those of the press molds, as indicated by the dotted lines in Fig. 5, and Fig. 6. In reference to this feature of my invention, further reference will presently be had.

The circular rack 14 secured to the underside of the carrier table 9 meshes with the pinion 15 that is carried by an upright shaft 16 journaled in the housing 17. On the lower end of the shaft 16 is the bevel gear wheel 18 which meshes with the bevel gear wheel 19 mounted loosely on the driving shaft 20. Such connections are had between the driving shaft 20, and the said bevel gear wheel 19, that by the rotation of the driving shaft 20, the movement of the carrier table is accomplished, as will be hereinafter described. For the application of the driving power for operating the machine, there may be arranged a pulley 21 carried by a shaft 22 upon which is the gear wheel 23 meshing with the gear wheel 24 that is secured to the driving shaft 20.

Figures 4, 13, 14:
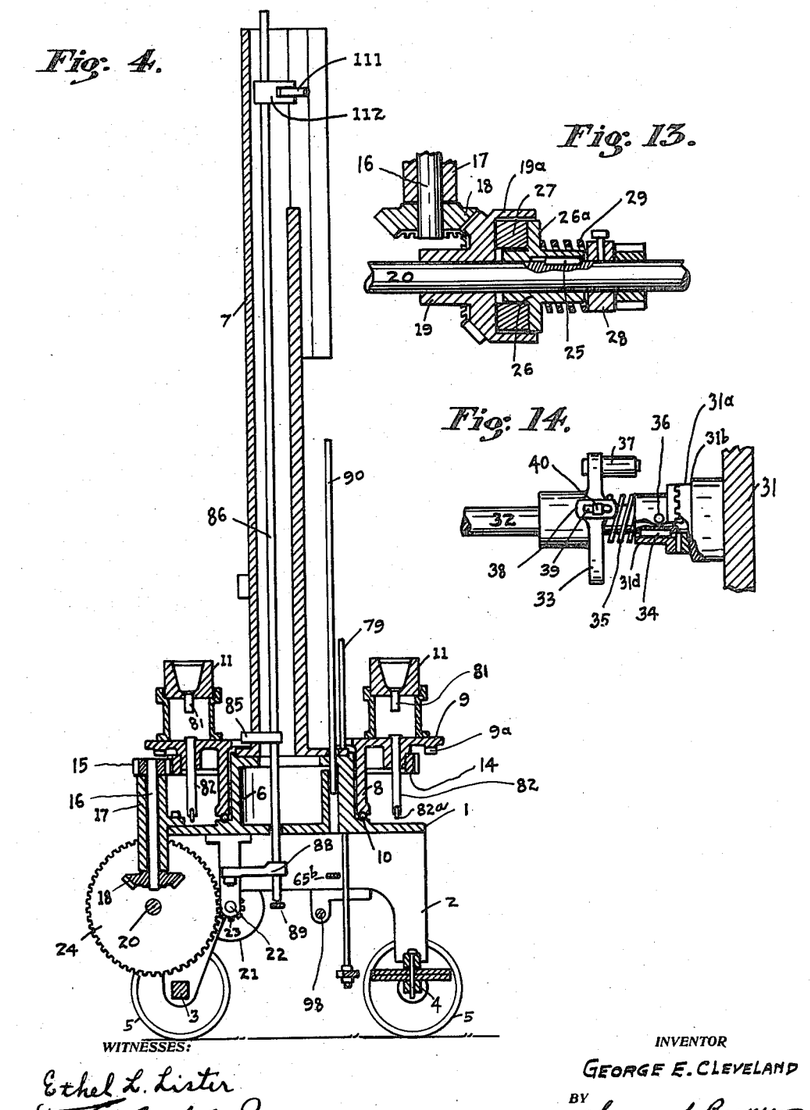
Fig. 4 is a central transverse sectional view of Fig. 1.
Fig. 13 is a detached enlarged sectional view of the clutch mechanism carried by the driving shaft 20.
Fig. 14 is a detached enlarged sectional view of the clutch mechanism carried by the control shaft 32.

The movement of the carrier table being intermittent with that of the other parts of the machine, as will be more fully stated hereinafter, a suitable clutch mechanism such as illustrated in Fig. 13, is provided. Mounted slidingly on the driving shaft 20 but held against rotative movement therein by the feather 25 is the sleeve 26 which has the flange 26$^a$. Secured to this flange are wooden blocks 27 which are adapted to bear against the rear face of the gear wheel 19, and which are inclosed by the peripheral flange 19$^a$. By the adjustable collar 28 the pressure of the coil spring 29 against the flange 26$^a$ may be adjusted.

The gear wheel 30 carried by the driving shaft 20 meshes with the gear wheel 31 that is secured to the control shaft 32. A trip wheel 33 is also secured on this control shaft 32. The function of this trip wheel is to actuate at intervals, the several parts or members which will be presently referred to. To accomplish the operation of the control shaft at intervals only, the clutch mechanism illustrated in Fig. 14 is used. The hub of the gear wheel 31 has the portion 31$^a$ of reduced diameter to form the annular shoulder 31$^b$ and is divided transversely, the meeting faces of the main portion and end portion 31$^d$ so formed, being toothed to co-engage each other. The main portion of the hub is secured to the said control shaft and the end portion 31$^d$ is disposed slidingly but held against rotation thereon by the feather 34. 35 designates a coil spring the ends of which bear against the said end portion 31$^d$, and the trip wheel 33 whereby the former is pressed normally into locked engagement with the main portion of the hub. 36 designates a stud disposed in the end portion 31$^d$ of the aforesaid hub. It will be obvious that by a longitudinal movement of the end portion 31$^d$ whereby it is disengaged from the gear wheel 31, the control shaft will cease to operate.

Carried by the trip wheel 33 is the roller stud 37 and the cam block 38. This cam block has a central slot 39 and by the set screw 40 which passes through same, is capable of adjustment transversely on the trip wheel.

The functions of all of the aforesaid parts will presently be made clear.

Slidingly disposed in the guide block 41 that is supported on the frame plate 1, is the latch-bar 42 the upper end of which engages one of the notches 9$^a$ of the carrier table. This latch bar is urged upwardly by the coil spring 43, and the limit of the movement of the said latch bar is defined by a suitable opening in the guide block, in which opening is free to move the end of the upper arm of the bell-crank lever 44 and which end loosely engages a transverse recess 42$^a$ in the latch bar. The lower arm of the said bell crank lever has the roller stud 44$^a$ and is so disposed as to be engaged by the trip 45 that is carried by the control shaft 32. When the stud 44$^a$ is engaged by the trip 45, the upper arm of the bell crank lever will move the latch bar downwardly and permit the carrier table to move until the next following notch reaches position when the latch bar snaps into the next notch 9$^a$ and holds the carrier table. The handle 46 carried by the bell crank lever is provided so that the carrier table may be released for movement independently of the trip 45.

Figures 1, 10:
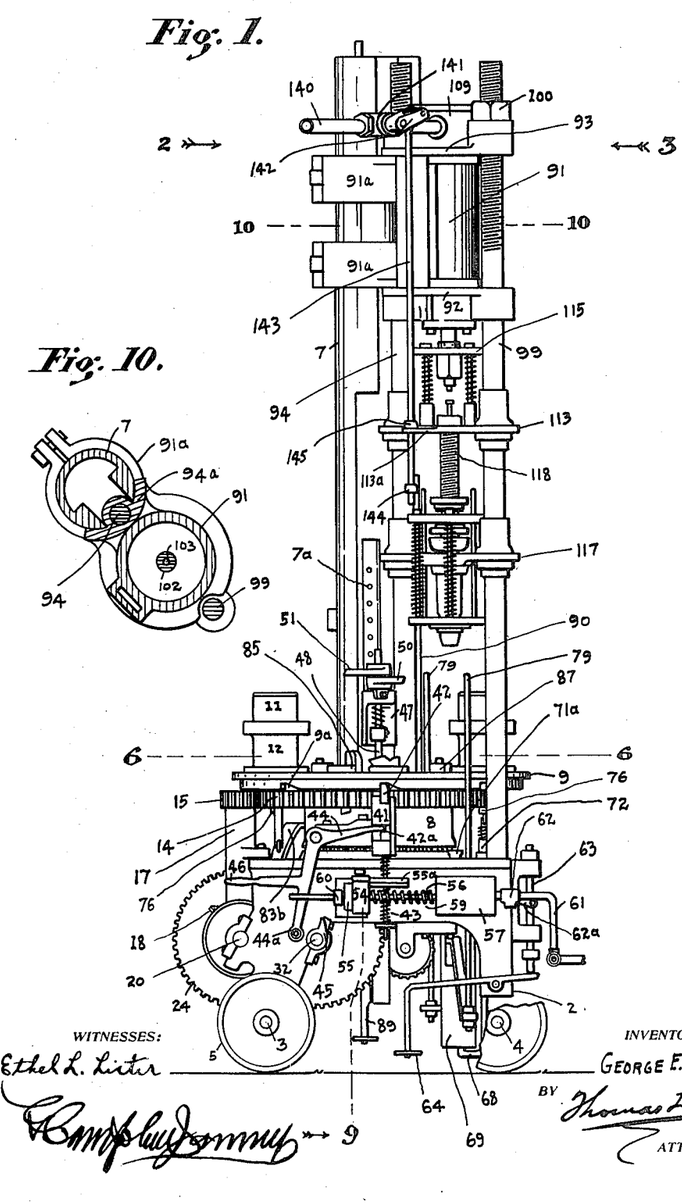
Figure 1 is a front view of my improved machine for making glass ware, and in which my present invention is embodied.
Fig. 10 is a transverse horizontal sectional view taken on the line 10—10 Fig. 1.
Figure 2:
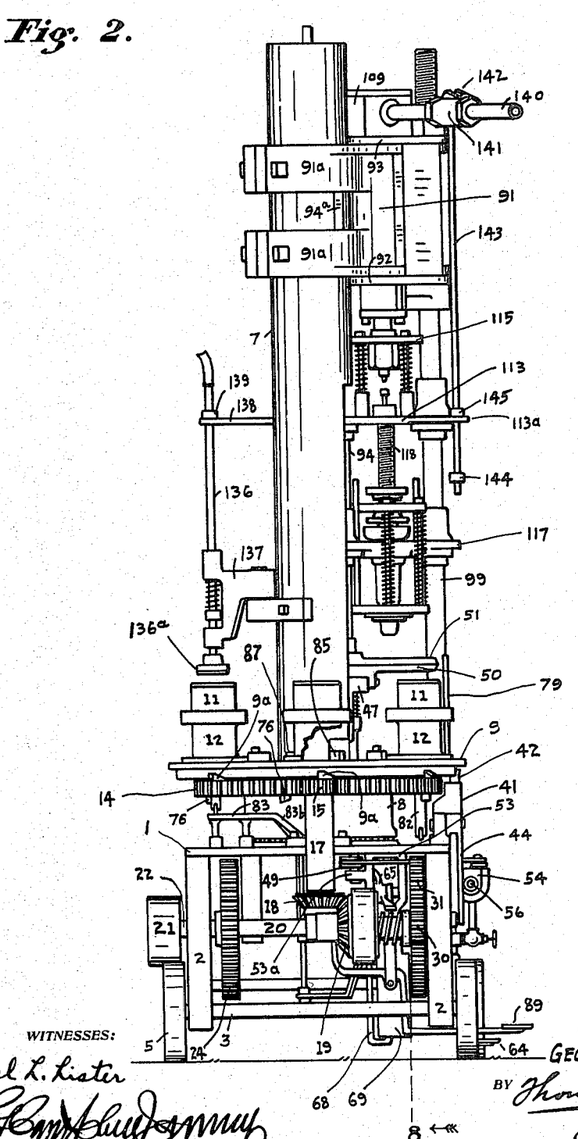
Fig. 2 is a side view taken in the direction of the arrow 2 in Fig. 1.
Figures 8, 9, 15:
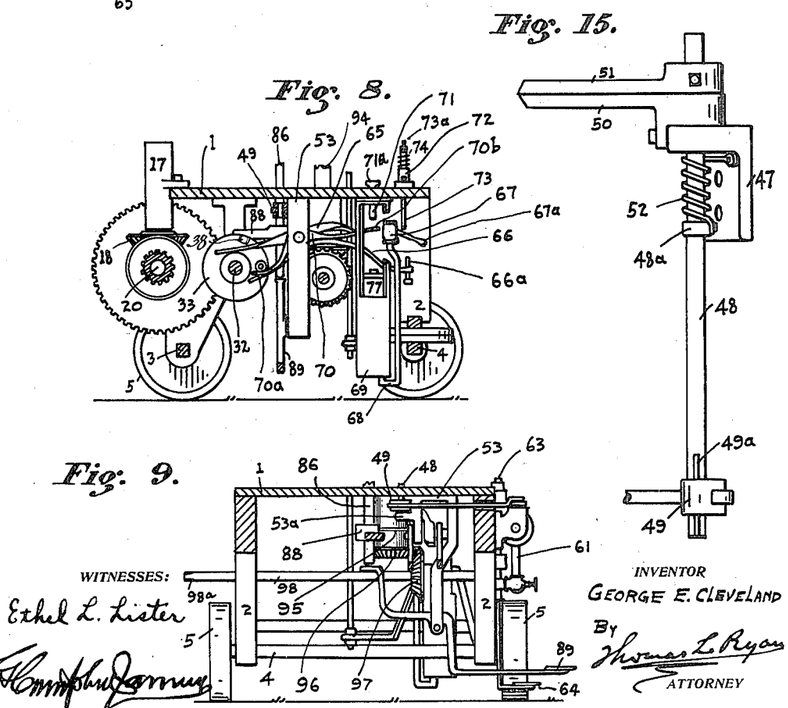

47 designates a bracket bolted on the column 7 as plainly shown in Fig. 1, and in Fig. 15. A series of holes 7$^a$ is provided so that the height of this bracket may be varied. The vertical shaft 48 is journaled in this bracket and its lower end resides slidingly in the crank 49, but is held against rotation thereon by a feather 49$^a$. Disposed on the upper portion of the said shaft are the shear blades 50 and 51 the shank of the former being secured against movement by being connected rigidly to bracket 47 and the shank of the blade 51 being secured adjustably to the shaft 48. Disposed beneath the bracket 47, and on the shaft 48 is the strong coil spring 52 the lower end thereof being fastened to the collar 48$^a$ that is secured to the shaft 48. The other end of the coil spring is fastened to the bracket. In the operation of shears in this character of machinery it is very essential that a correct, but yielding registration with each other of the shear blades may be had. By the arrangement and combination of the parts as shown, this desirable result is accomplished. When the shaft 48 is moved rotatively and the shear blade 51 is brought across the blade 50 the tension of the spring will draw the blade 51 downwardly, and a yielding contact of the blades is always assured. Upon the conclusion of the shearing operation the contact tension is automatically released both transversely and vertically.

Secured on the underside of the frame plate is the inverted pillow block 53. In the bracket 53ᵃ is journaled the lower end of the shaft 48, and between the upper face of the bracket and the underside of the frame plate the aforesaid crank 49 resides and is held against vertical movement, all as plainly shown in Fig. 9.

Figure 7:
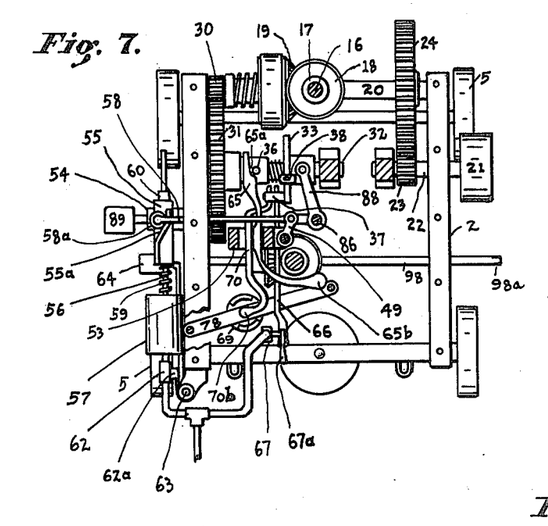
Fig. 7 is a horizontal sectional view taken on the line 7—7 Fig. 3.

Supported slidingly by a guide block 54 that is carried by the side member of the frame, is the cross head 55. This cross head has the cam 55ᵃ, as shown in Fig. 7, and is fastened rigidly to the piston rod 56 the piston head of which works in the cylinder 57.

58 designates a connecting rod that is passed transversely through the side of the frame, the inner end of which rod is pivotally secured to the crank 49, and the outer end has the friction roller 58ᵃ which will work on the cam 55ᵃ.

On the piston rod 56 and between the cross head 54 and the piston head that works in the cylinder 57 is the coil spring 59. This coil spring is of such tension that when the collar 60 on the said piston rod is properly adjusted, the piston head will be sustained at rearward position and the shear blades will stand in open position.

Figure 17:
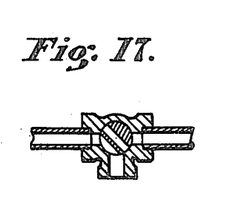
Fig. 17 is a sectional view of a three-way valve.

In the end of the cylinder 57 and at the rear of the piston is the inlet pipe 61, provided with a valve 62. This valve is operated by means of a vertically disposed movable member 63 which has suitable loose connection with the arm 62ᵃ of the said valve. The member 63 may be arranged to be moved either by the hand or by foot of the operator, the latter method is deemed preferable and I have shown the foot lever 64. The valve 62 is of three-way type and may be of the structure as shown in the detail view in Fig. 17. The operation is such that when the member 63 is raised there will be the inlet of steam or compressed air into the cylinder and then with the release of the member 63 the exhaust will occur. With the forward movement of the piston the shears will be operated and will as quickly open when the piston is returned to the rearward position.

Figures 3, 11, 20:
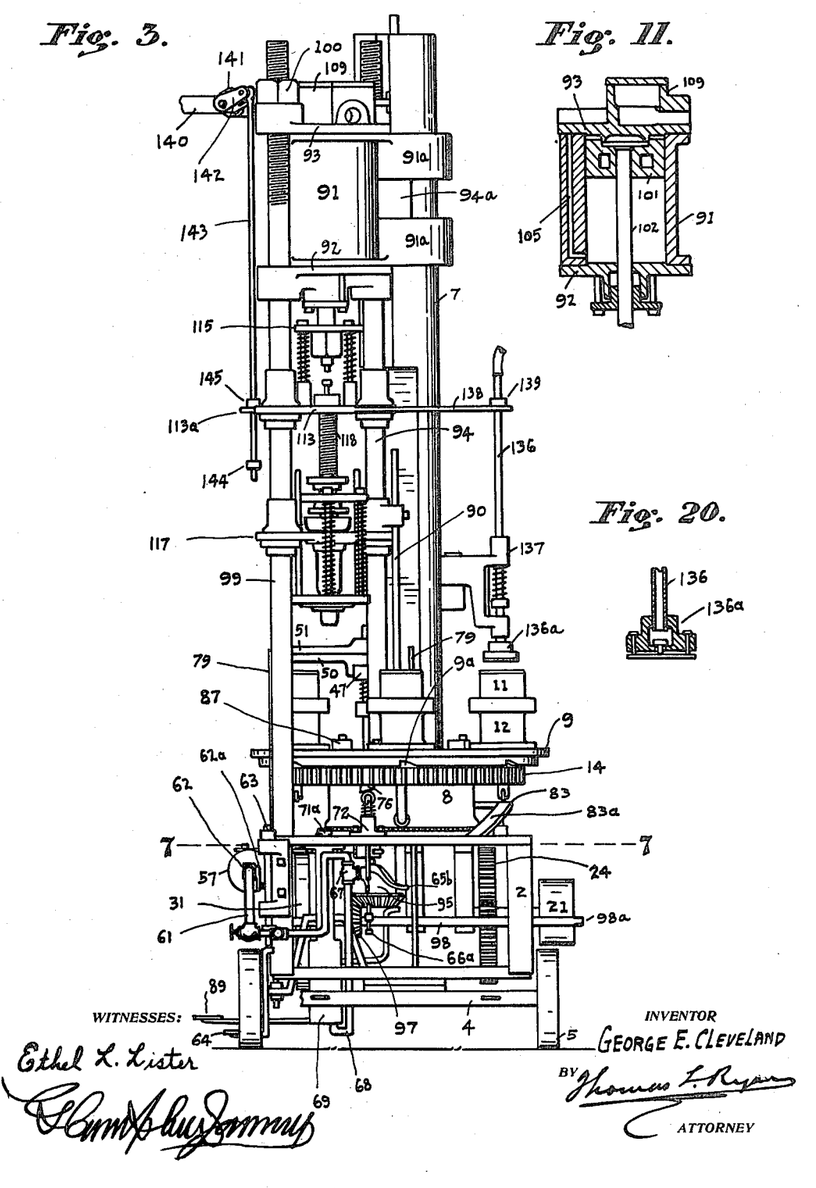
Fig. 3 is a side view taken in the direction of the arrow 3 in Fig. 1.
Fig. 11 is a vertical transverse sectional view of the cylinder taken on the line 11—11 Fig. 5.
Fig. 20 is a vertical sectional view of the blow-pipe valve.

Loosely supported on the inverted pillow block 53 is the trip lever 65 so balanced and which has the end of the forward arm of such width and is so tapered and provided with the offset 65ᵃ of such shape that when the said end occupies the position between the shoulder 31ᵇ and the stud 36, the end portion 31ᵈ of the hub of the gear wheel 31 is moved out of normal position, and the control shaft 32 is thrown out of operation. The rearward arm of this trip lever 65 is of such form that its head 65ᵇ will occupy the position, as shown in Fig. 3 and Fig. 7, capable of being depressed at certain intervals during the operation of the machine, as will be hereinafter described. 66 designates a second trip lever which is loosely supported on the inverted pillow block 53. Its forward arm is disposed in proper position to be engaged by the roller stud 37 of the trip wheel 33, and its rearward arm is of such form that the screw 66ᵃ carried in its end and which screw is capable of being set to adjusted position, will register with the arm 67ᵃ of the valve 67. The air or steam pressure that passes from a branch of the inlet pipe 61 and into the valve 67 is conveyed by the pipe 68 into the upright cylinder 69, the function of which cylinder will be presently referred to. The form of structure of this valve 67 is similar to that shown in Fig. 17. When this second trip lever 66 is operated by the trip wheel 33 the rearward arm of said lever will be raised and the screw 66ᵃ engaging and raising the arm 67ᵃ will operate the valve 67 to permit the inlet of pressure into the upright cylinder. 70 designates a third trip lever which is carried loosely on the inverted pillow block 53. The end 70ᵃ of the forward arm of this third trip lever is capable of being engaged by the roller stud 37 of the trip wheel 33, as shown in Fig. 7, and the rearward end 70ᵇ will occupy a position underneath the press mold when same is at the pressing station. At this location in the frame plate is provided a hole, in which is disposed the slide bar 71 that has the head 71ᵃ. The rearward end of this third trip lever, when raised, will raise the slide bar 71, which will in turn raise the lift valve of the press mold. The utility of this arrangement will be presently more fully referred to.

Mounted on the frame plate 1 at a point above the arm 67ᵃ of the valve 67 is a guide block 72 in which is slidingly disposed the slide bar 73 the lower portion of which extends below the frame plate, as shown in Fig. 3 and in Fig. 8. This slide bar has a roller 73ᵃ in its upper end, and is maintained in raised position by the coil spring 74. On the underside of the rack and spaced at proper intervals are carried the beveled studs 76 adapted to engage the roller 73ᵃ, as the carrier table is rotated. With the engagement of the roller 73ᵃ by the stud 76 and the depressing of the slide bar 73, the arm 67ᵃ will be depressed to its lower position; thus the inlet will be closed and exhaust will occur.

The upright cylinder 69 is of the general form and structure as shown in Fig. 8 its upper portion being bolted to the underside of the frame plate 1. It is provided with the plunger piston 77 which carries a cross head 78 to the opposite ends of which are secured the uprights 79 that extend upwardly to a plane above the tops of the molds 11 and the function of which uprights is to lift from the mold, the blank lifter presently to be described. Secured to the top ends of the uprights 79 are the brackets 79$^a$ upon which are carried the ends of the blank lifter. A blank lifter 80 of suitable form and structure is shown in Fig. 18; the end plates 80$^a$ are provided with studs on their undersides which will engage corresponding recesses in the brackets 79$^a$ of the uprights.

In the open bottom of each of the press molds is the lift valve 81, which when raised will permit the ingress of air at the bottom of the mold, and which will also facilitate the removal of the pressed glass article from the mold. To accomplish this operation of the lift valves, a push bar 82 having a roller 82$^a$ in its bottom is disposed slidingly beneath each mold. A mutilated track 83 which is disposed at proper elevation and which has the incline 83$^a$ and the decline 83$^b$ is so positioned that it will cause the raising and the lowering of the push bars 82 at the proper predetermined intervals. When blown ware is to be made it is desirable that this operation of raising the lift valve 81 shall occur immediately after the pressing operation so that the glass article may be easily withdrawn from the mold by the raising of the blank lifter. To accomplish this is the function of the third trip lever 70 to which further reference will be presently made.

Figures 5, 6, 18:
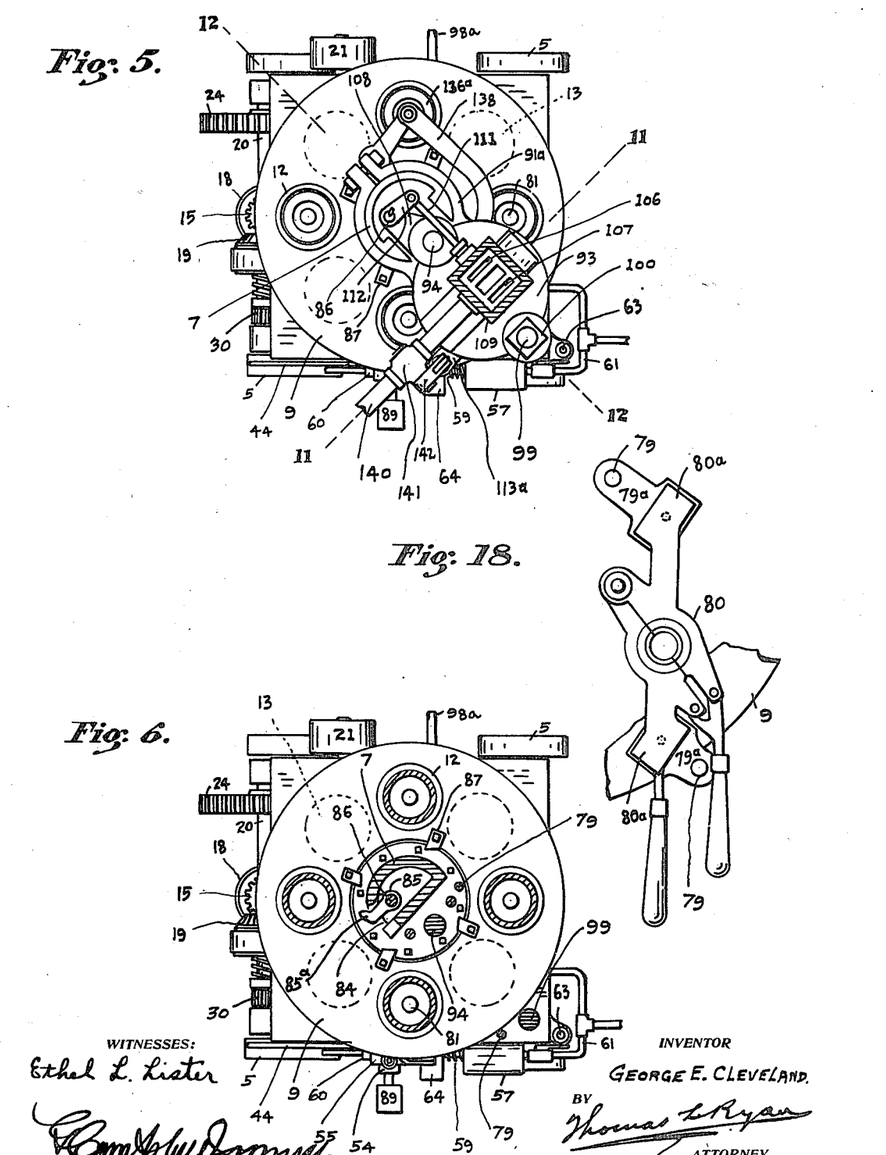
Fig. 5 is a plan view, the cover of the valve chest having been removed.
Fig. 6 is a horizontal sectional view taken on the line 6—6 Fig. 1.
Fig. 18 is an enlarged plan view of the blank lifter.

The form in cross section of the column 7 is shown plainly in Fig. 6; at the lower end is the recess 84 in which the dog 85 may work. This dog is secured to the vertical shaft 86 and has the nose 85$^a$. The trip lugs 87 are of such form and are secured on the inner annular edge of the carrier table at such locations that the dog 85 will be operated at predetermined intervals. To the lower end of the vertical shaft 86 (see Fig. 7) is secured the arm 88 the free end of which will stand, with reference to the trip wheel 33, in such position that the said arm will be engaged and moved by the passing of the cam block 38. It being desirable, as will be hereinafter explained, that the space through which this arm 88 is to be moved, may be varied, the cam block 38 on the trip wheel 33 is made capable of adjustment as hereinbefore described.

89 designates an emergency lever capable of being moved by the foot of the operator. The interior end of this lever bears against the bottom of the vertical shaft, as shown in Fig. 9. When the vertical shaft is raised the dog 85 will not be actuated by the trip lugs, and the operation of the cylinder to be hereinafter referred to, may be discontinued, without necessarily arresting the rotary movement of the carrier table.

90 designates a trip rod secured to the plunger mechanism, and which is capable of vertical adjustment. The function of this trip rod is to depress the end 65$^b$ of the trip lever 65, at the limit of the downward movement of the plunger head.

The form, in cross section of the upper portion of the column 7 is plainly shown in Fig. 10. The arms 91$^a$ of the cylinder 91 encircle and slidably engage the upper part of the column. Through the bored bosses 92$^a$ and 93$^a$ of the cylinder heads 92 and 93 respectively passes the support post 94. The upper portion of this support post is threaded and will work in the threaded block 94$^a$ which is disposed between the arms 91$^a$. The lower portion of the said support post is shouldered and is journaled in the bearing 95, as shown in Fig. 9; on its bottom end is secured the bevel gear wheel 96 which meshes with a bevel gear wheel 97 carried by the shaft 98, which has suitable journal bearings in the side members of the frame. The end 98$^a$ of this shaft 98 is of form to receive a suitable hand crank. By manipulation of this shaft 98 the desired position of the cylinder vertically may be easily obtained.

The bottom of the support post 99 is secured to the frame plate in suitable manner, and the upper portion is threaded in a manner similar to that of the support post 94. The bores of the bosses 92$^b$ and 93$^b$ are smooth to permit of the free movement vertically of the cylinder. Above the boss 93$^b$ is provided the nut 100, the function of which will be presently referred to.

The cylinder is provided with the piston 101 the rod 102 of which has the longitudinal perforation 103. The upper side of the piston has a recess 101$^a$ in which the projection 93$^c$ of the cylinder head 93 will snugly fit when the piston head is at the limit of its upward movement. By this arrangement an air space is formed which prevents knock or pound of the piston when it is driven to the upper end of the cylinder. The port passage 105 enters the lower end of the cylinder, as shown in Fig. 11 and its upper end terminates in the port opening 106 in the cylinder head 93.

107 designates a port that leads from the valve seat directly into the upper end of the cylinder.

In the valve chest 109 is disposed the D valve 110 the stem 111 of which is pivotally connected to the crank 112. (See Fig. 5.) This crank is sustained in position on the arm 108 that extends from the cylinder head and being feathered to the vertical shaft 86 will be moved rotatively by but is capable of being moved vertically on the said vertical shaft. The cross plate 113 provided with suitable guide sleeves which slidingly engage the support posts 94 and 99 is supported by the upright bars 114 whose upper ends are carried loosely by the spring plate 115 which is secured to the bottom end of the piston rod 102. The coil springs 116 which are arranged between the cross plate and the said spring plate, while maintaining normal the distance between these members afford a connection of desired elasticity the utility whereof will be presently made apparent. The cross plate 117 having the guide sleeves similar to those just hereinbefore referred to, is also capable of vertical movement on the support posts and is connected to the threaded center rod 118. The upper end of this threaded center rod is rigidly secured to the cross-plate 113, and has the trip stud 119. This trip stud 119 is capable of vertical adjustment and its function is to engage the valve stem 121 when the piston 102 is depressed to lowermost position as will be hereinafter referred to. The valve box 120 into which leads the perforation 103 has the opening 122 which is closed by the valve 121$^a$. Leading from the opening 122 are the exhaust passages 123.

Figures 12, 19:
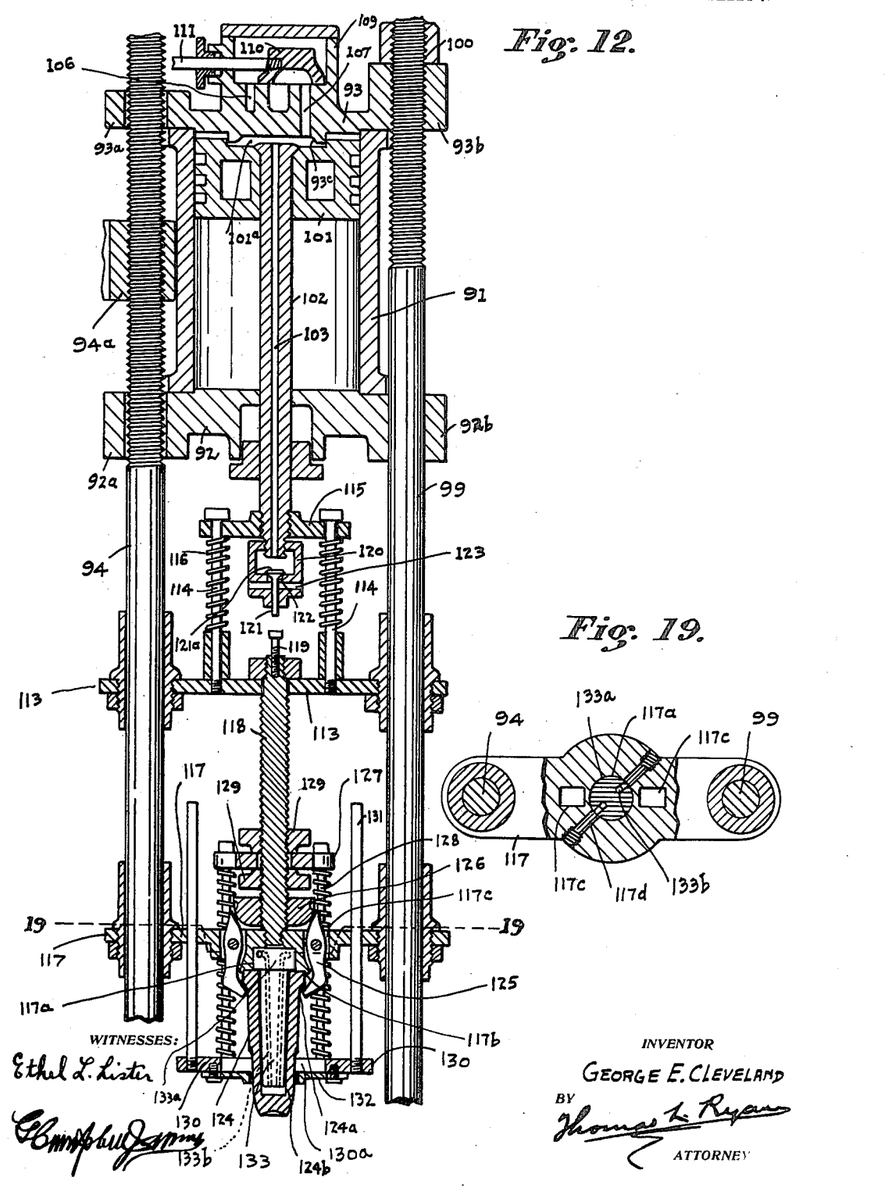
Fig. 12 is an enlarged transverse sectional view taken on the line 12—12 Fig. 5.
Fig. 19 is a horizontal sectional view taken on the line 19—19 Fig. 12.
Figure 16:
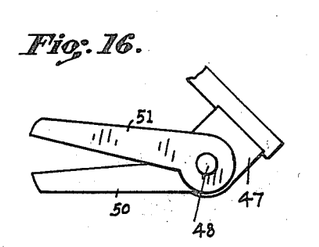
Fig. 16 is a plan view of the shears.

In the annular recess 117$^a$ of the cross plate 117, and which annular recess has the offset 117$^b$, is removably disposed the plunger head 124. This plunger head is so formed that its top end will fit snugly in the offset 117$^b$, as shown in Fig. 12, and its beveled shoulder 124$^a$ will be engaged by the noses of the dogs 125 which are pivotally supported in the suitable recesses 117$^c$ therefor in the cross plate 117. When the plunger head is placed in the position as shown, and the tightening ring 126 that is carried by the center rod 118 and which engages the rounded ends of the dogs, is screwed down, the noses of the dogs will be brought into tight engagement with the shoulder 124$^a$ of and will hold the plunger head 124 in correct position.

The spring plate 127 is supported in adjustable position on the center rod 118 by the adjusting heads 129. Depending from this spring plate 127 are the rods 128 the lower ends of which are secured to the head plate 130. The aperture 130$^a$ in this head plate is of size sufficient to permit the plunger head to be passed therethrough in assembling the parts. Correct transverse position of this head plate is maintained by the guide rods 131 carried thereby and which rods will move slidingly in the cross plate 117. The head ring 132 is detachably secured by suitable bolts to the bottom of the head plate 130, and has a bore of suitable diameter to engage loosely the plunger head 124.

To maintain the temperature of the point of the plunger head at proper degree and to prevent overheating, I have provided the structure as shown in Fig. 12 and Fig. 19. The barrel 133 which will reside in the ample bore 124$^b$ of the plunger head has its head 133$^a$ to occupy the recess 117$^a$ of the plunger cross plate 117. The continuous channels 133$^b$ extend from the head 133$^a$ downwardly through said barrel and the upper open ends communicate with the perforations 117$^d$ in the cross plate 117. Water is fed through the perforations 117$^d$ and said channels from a suitable pipe. (Not shown.)

The blow pipe 136 which has the valve 136$^a$ of approved structure, such as shown in Fig. 20, is supported in the bracket 137 which is carried on a suitable lug secured to the column 7. This blow pipe is lifted from its operable position by the arm 138 when the piston 102 reaches the limit of its upward stroke, and the correct position of the valve 136$^a$ above the mold is obtained by the adjustment of the collar 139.

140 designates the inlet pipe through which the driving power preferably compressed air, for the cylinder 91 is conveyed.

A suitable throttle valve 141 has the arm 142 from which depends the rod 143, the lower portion of which is hung loosely in an aperture provided in the arm 113$^a$ carried by the cross plate 113. The collars 144 and 145 are adapted to be engaged by the arm 113$^a$ when the piston is at its lower and at its upper positions respectively. It will be understood that this throttle valve is so adjusted that a sufficient normal pressure is permitted in the valve chest 109. When the valve 110 is moved and the piston head descends, the plunger head is lowered into the press mold where the initial pressing operation is effected by the said normal lowering of the plunger head. It is very essential that just at this stage of the pressing operation that a quick and effective pressure be exerted by the plunger head to complete the filling of the mold by the plastic glass. One of the most essential features of my invention is that I accomplish this action effectively. Simultaneously with the arrival of the plunger head at its said lowered position, the arm 113$^a$ engages the collar 144, which causes a further opening of the throttle valve 141. The final pressure being given just prior to the reverse movement of the D valve whereby the plunger head is raised, as will be hereinafter further referred to.

The several parts of my improved machine when same is in readiness for operation, occupy the relative positions as shown in the drawings, the plunger head being in the elevated position. Through the gearing shown the driving shaft 20 is normally in continuous operation and by the friction of the wooden block 27 in the clutch on said driving shaft the carrier table will be moved whenever released by a depressing of the latch bar. Upon the delivery by the gatherer, of the plastic glass above the press mold when in the position adjacent the shears, the operator depresses the foot lever thereby opening the valve 62. With the entry of the compressed air into the cylinder 57; the shears are instantly operated, the charge of glass so severed drops directly into the mold. The position of the trip 45 on the control shaft is such that the latch bar 42 is lowered which permits the carrier table to move. The press mold containing the charge of glass is brought to the pressing station underneath the plunger just as the dog 85 is moved by the lug 87 by which movement the D valve 110 is shifted. The port 107 is opened, and the piston descends, the plunger head being lowered into the press mold.

The action of the plunger mechanism thus far described is not unusual, the contact of the head plate 130 on the pressed glass being cushioned by the springs 128$^a$ between said head plate and the spring plate 127. However by the combination and arrangement of parts between the piston head and the plunger head I obtain such control of the plunger that the most delicate action and continuing pressure may be had, and all danger of breakage is overcome.

By having the yielding connection between the plunger head and the piston head and the means of control of the inlet of pressure into the cylinder, my improved machine may be adjusted to handle glass of varying consistency. As the plunger head nears the limit of its downward movement the said yielding connection will afford the desired momentary dwell of the plunger. At this stage of the pressing operation the collar 144 is engaged by the arm 113$^a$, which causes an additional inlet of pressure through the throttle valve. With this increase of pressure the extreme downward movement of the plunger is made with such force that the glass is quickly caused to completely fill the mold and the article so pressed is complete. Should the piston, through adjustment not proper for the quality of glass being worked, have a tendency to move downwardly too far, the valve stem 121 is raised by its contact with the strip stud 119, and the pressure in the cylinder is permitted to escape, thus preventing injury or breakage of the glass. The stud 36 having been engaged by the offset 65$^a$ of the trip lever 65 has maintained separated, the hub of the gear wheel 31. Coincidently with the arrival of the plunger at the limit of its downward stroke as just described, the bottom end of the trip rod 90 has depressed the end 65$^b$ of the trip lever 65, and raised its forward end whereby the divided por-
tions of the hub of the gear wheel are reunited and the control shaft is again set in motion.

The positions of the cam block 38 and the roller stud 37 of the trip wheel 33 with reference to each other and to the second trip lever 66 and the third trip lever 70, and to the arm 88 of the vertical shaft 86, are such that immediately after the engagement by the cam block 38 of the arm 88 whereby the vertical shaft 86 is moved and the D valve 110 returned to the position as shown in Fig. 12, (and whereby the pressure is let into the bottom of the cylinder 91 to raise the piston) the roller stud 37 actuates the said second trip lever 66 and the third trip lever 70. The result of this operation is that the slide bar 71 is by the third trip lever 70, given a quick movement upwardly against the push bar 82 which loosens from the press mold the article that has just prior thereto been pressed. By the performance of this function the subsequent bodily removal of the article from the mold is greatly facilitated and the possibility of mutilation or injury thereto is prevented. Immediately following and practically coincidently with this loosening of the article, the valve 67 is operated by the second trip lever 66 whereby the pressure in the upright cylinder 69 will raise the uprights 76 upon which are carried the blank lifter 80.

It will be understood that the blank lifter is employed only where the press molds are used for the forming merely of blanks which are to be lifted from the press mold and passed over to the blow mold (not shown) the locations for which are shown by the dotted lines in Fig. 5 and Fig. 6.

The pressure in the upright cylinder 69 will maintain the uprights 79 at the raised position long enough for the operation to remove the blank lifter, and until, as the carrier table moves onward, the stud 76 will cause a downward movement of the slide bar 73 whereby the valve 67 is operated to cause the exhaust of the pressure in said upright cylinder, and the consequent downward return to normal position of the uprights 79.

Inasmuch as in this portion of the description of my invention I am describing the mode of its operation only where pressed ware solely is to be made, it may be pointed out here that the lowering of the screw 66$^a$ so that it will not engage the arm 67$^a$ of the valve 67, will cause the upright cylinder to remain inoperative.

The glass article having been pressed and loosened from possible adhesion to the mold, the carrier table in its onward movement will bring the mold into position above the track 83. Upon engagement by the push bar 82 with the incline 83$^a$ and then the track 83, the article will have been gently raised from the mold to such position that it may easily be taken away.

It will be obvious that with the combination and arrangement of the essential elements or parts, as effected in this machine, whereby the movements and adjustments aforesaid are accomplished, the machine is capable of the making of pressed ware solely, or the making of blown ware. The mold arrangement for the former practice is that shown in the drawings, it being obvious that where more than the four molds are used, there would be a corresponding change in the number of trip lugs 87, cam blocks 38, and roller studs 37. Where the machine is to be used for making blown ware, suitable blow molds would be arranged on the carrier table, to alternate in proper order with the press molds. The blank deposited in the press mold would be operated upon at the station underneath the blow pipe valve 136ª, in the usual way.

The cylinder 91 which is held slidingly in correct position on the column 7, is supported on the support post 94, which is capable of being rotated in the threaded hole in the block 94ª. To effect the raising or lowering of this cylinder a crank or wrench is applied to the shaft 98 upon the rotation of which, the said support post will, by the bevel gear wheels 96 and 97 be rotated. The function of the nut 100 is to lend support and stability to the cylinder against tendency to displacement or upward movement, when the pressing operation is performed.

What I claim as my invention and desire to secure by Letters Patent, is—

1. In a machine of the kind described, the combination of a mold, a pressure cylinder above the mold and having a piston, a plunger for the mold, yieldable connections between the plunger and the piston, a valve to cause the inlet and outlet of the pressure to the cylinder to reciprocate the piston, means to move said valve, devices moved by the piston to actuate the said valve moving means, connections between the piston and the cylinder to vary the flow of pressure to the said cylinder.

2. In a machine of the kind described, the combination of a mold, a pressure cylinder above the mold and having a piston, a plunger for the mold, yieldable connections between the plunger and the piston, a valve to cause the inlet and outlet of the pressure to the cylinder to reciprocate the piston, means to move said valve, devices moved by the piston to actuate the said valve moving means, a throttle valve, connections between the throttle valve and the piston whereby the former may be operated at each end of the piston's stroke.

3. In a machine of the kind described, the combination of a mold, a pressure cylinder above the mold and having a piston, a plunger for the mold, a valve to cause the inlet and outlet of the pressure to the cylinder to reciprocate the piston, means to move said valve, devices moved by the piston to actuate the said valve moving means, connections between the piston and the cylinder to vary the flow of pressure to the said cylinder, an escape valve for the upper end of the cylinder, yieldable connections between the plunger and the piston, a device between the plunger and the piston capable of being actuated by the latter to open said escape valve.

4. In a machine of the kind described, the combination of a table, a mold on the table, support posts, a pressure cylinder above the mold and having a piston, said cylinder being capable of retention at various adjusted positions on the said support posts, a cross plate having slidable connections with said support posts, a plunger head carried by the said cross plate, a center rod having its bottom end secured to the cross plate, yieldable connections between the center rod and the cylinder piston.

5. In a machine of the kind described, the combination of a table, a mold on the table, support posts, a pressure cylinder above the mold and having a piston, said cylinder being capable of retention at various adjusted positions on the said support posts, a perforation extending through the piston rod, a cross plate having slidable connections with the support posts, a plunger head carried by the cross plate, a center rod having its bottom end secured to the cross plate, yieldable connections between the piston and the center rod, a valve box forming the bottom terminal of the piston rod and having a standing valve therein, a trip stud in the top of the center rod to engage said standing valve when the distance between the piston and the center rod is reduced.

6. In a machine of the kind described, support members, a plunger comprising a cross plate capable of vertical movement on said support members, said cross plate having a central countersunk recess, a hollow plunger head having a shouldered top to fit in said countersunk recess, a barrel having its top portion of diameter to fit snugly in the recess therefor in the cross plate, the body portion of the barrel being of diameter smaller than that of the bore of the plunger head, there being perforations through said barrel, and passageways through the cross plate to communicate with said perforations, means carried by the cross plate to hold the plunger head in detachable engagement with the cross plate.

7. In a machine of the kind described, support members, a plunger comprising a cross plate capable of vertical movement on said support members, said cross plate having a central countersunk recess, a hollow plunger head having a shouldered top to fit in said countersunk recess, a barrel having its top portion of diameter to fit snugly in the recess therefor in the cross plate, the body portion of the barrel being of diameter smaller than that of the bore of the plunger head, there being perforations through said barrel, and passageways through the cross plate to communicate with said perforations, means carried by the cross plate to hold the plunger head in detachable engagement with the cross plate, including a plurality of dogs carried by said cross plate their lower ends to engage the upper portion of the plunger head, a center rod secured to said cross plate, a member capable of vertical adjustment on said center rod, the peripheral face of which member when same is moved downwardly on said center rod will move apart the upper ends of said dogs.

8. In a machine of the kind described, the combination of a carrier, molds on said carrier, a plunger, means to raise and lower the plunger, drive gearing to move the carrier, a yieldable coupling in the said drive gearing which will be rendered inoperative while the carrier is held against movement, a latch member to stop and to hold the carrier, a control gearing actuated by the drive gearing and having a clutch coupling therein, a trip carried by the continuously operating portion of the control gearing to actuate the said latch member, a trip member disposed so as to normally hold the control gearing uncoupled, connections between the plunger and the said trip member whereby the latter will be moved and the entire control gearing will be rendered operative when the plunger reaches the limit of its downward stroke, a lift bar underneath the mold, a trip lever to operate said lift bar, a trip wheel carried by the control gearing to actuate the trip lever for raising the lift bar immediately after the plunger has commenced to move upwardly.

9. In a machine of the kind described, the combination of a carrier, molds on said carrier, a plunger, means to raise and lower the plunger, drive gearing to move the carrier, a yieldable coupling in the said drive gearing which will be rendered inoperative while the carrier is held against movement, a latch member to stop and to hold the carrier, a control gearing actuated by the drive gearing and having a clutch coupling therein, a trip carried by the continuously operating portion of the control gearing to actuate the said latch member, a trip member disposed so as to normally hold the control gearing uncoupled, connections between the plunger and the said trip member whereby the latter will be moved and the entire control gearing will be rendered operative when the plunger reaches the limit of its downward stroke, a lift bar underneath the mold, a trip lever to operate said lift bar, a trip wheel carried by the control gearing to actuate the trip lever for raising the lift bar immediately after the plunger has commenced to move upwardly, a lifting means disposed underneath the carrier, uprights carried by said lifting means and which extend above the carrier, devices operated by the said trip wheel to actuate the lifting means immediately after the plunger has commenced to move upwardly.

10. In a machine of the kind described, the combination of a carrier, molds on the said carrier, a pressure cylinder disposed above the carrier and having a piston, a valve to control the inlet and outlet of pressure for the cylinder, a plunger adapted to be operated by the said piston, a rock shaft to operate said valve, drive gearing to move the carrier, a yieldable coupling in the said drive gearing which will be rendered inoperative while the carrier is held against movement, a latch member to stop and to hold the carrier, a control gearing actuated by the drive gearing and having a clutch coupling therein, a trip carried by the continuously operating portion of the control gearing to actuate the latch member, a trip member disposed so as to normally hold the control gearing uncoupled, connections between the plunger and the said trip member whereby the latter will be moved and the entire control gearing will be rendered operative when the plunger reaches the limit of its downward stroke, a lift bar underneath the mold, a trip lever to operate the said lift bar, a trip wheel carried by the control gearing to actuate the trip lever for raising the lift bar after the plunger has commenced to move upwardly, a dog carried by the aforesaid rock shaft, trip lugs carried by the carrier to engage said dog when the mold has been brought to position underneath the plunger, an arm secured to the aforesaid rock shaft, a cam-block carried by the aforesaid trip wheel to move the said arm after the pressing operation has been completed.

11. In a machine of the kind described, the combination of a frame, a rotatable carrier thereon, molds on the carrier, a central support, a bracket on said central support, a vertical shaft having its upper end journaled in the said bracket and its lower end journaled in the said frame, complemental shear blades, the upper blade being secured to the said shaft and the lower blade being secured to the bracket, a coil spring to surround and having its one end secured to the shaft, and the other end being secured to the bracket so as to hold the shears normally closed, a crank in which the said shaft is free to move longitudinally but is held against rotation therein, means to oscillate said crank.

12. In a machine of the kind described, the combination of a frame, a rotatable carrier thereon, molds on the carrier, a central support, a bracket on said central support, a vertical shaft having its upper end journaled in the said bracket and its lower end journaled in the said frame, complemental shear blades, the upper blade being secured to the said shaft and the lower blade being secured to the bracket, a coil spring to surround and having its one end secured to the shaft, and the other end being secured to the bracket so as to hold the shears normally closed, a crank in which the said shaft is free to move longitudinally but is held against rotation therein, a guide block carried by the frame, a cross head slidingly disposed in said guide block and having a cam thereon, a pressure cylinder having the piston thereof connected to said cross head, a spring to hold the piston in normally retracted position, a rod having connection with the said crank and being provided with a roller bearing to engage the aforesaid cam, substantially as described.

13. In a machine of the kind described, the combination of a frame, a carrier thereon, molds on the carrier, a support rising from the frame, a pressure cylinder mounted on the support provided with a valve chest, and having a piston, a plunger, yieldable connections between the plunger and the piston, a valve in the valve chest to control the inlet and outlet of pressure for the said cylinder, means to operate the said valve, a throttle valve in the inlet of the valve chest, connections between the plunger and the throttle valve to increase the opening of the throttle valve near the limit of the downward movement of the plunger and to return the throttle valve to normal position near the limit of the upward movement of the plunger.

14. In a machine of the kind described, the combination of a frame, a carrier thereon, molds on the carrier, a support rising from the frame, a pressure cylinder mounted on the support provided with a valve chest and having a piston, a plunger, yieldable connections between the plunger and the piston, a valve in the valve chest to control the inlet and outlet of pressure for the said cylinder, means to operate the said valve, a throttle valve in the inlet of the valve chest, connections between the plunger and the throttle valve to increase the opening of the throttle valve near the limit of the downward movement of the plunger and to return the throttle valve to normal position near the limit of the upward movement of the plunger, an escape valve for the upper end of the pressure cylinder, devices between plunger and the end of the piston to operate said escape valve when the distance between the said plunger and piston is reduced.

15. The combination in a machine of the kind described, of a mold, a pressure cylinder having a piston, a plunger for the mold operated by the said piston, yieldable connections between the plunger and the piston, including a spring-plate carried by the piston rod, a cross-plate, suspension rods hung loosely in the spring-plate and having their bottoms secured to the cross-plate, springs between the said spring-plate and the cross-plate, said plunger having its upper end secured to the said cross-plate, guideways for said plunger and the said cross-plate, substantially as described.

16. The combination in a machine of the kind described, of a mold, a pressure cylinder having a piston, a spring-plate carried by the piston-rod, a cross-plate, suspension rods hung loosely in the spring-plate and having their bottoms secured to said cross-plate, springs between the spring-plate and the cross-plate, a center-rod having its upper end secured to the said cross-plate, a lower cross-plate secured to the bottom of the center-rod, a plunger-head carried by said lower cross-plate, a head-plate disposed below the lower cross-plate and having a central opening therein concentric to the plunger-head, a secondary spring-plate carried by the center-rod, suspension rods hung loosely in the said secondary spring-plate and having their bottoms secured to the said head-plate, springs between the head-plate and the secondary spring-plate, guideways for said cross-plates, substantially as described.

17. In a machine of the kind described, support members, a plunger including a cross-plate capable of vertical movement on said support members said cross-plate having a central countersunk recess, a plunger-head having a shouldered top to fit in said countersunk recess, means carried by the cross-plate to hold the plunger-head in detachable engagement with the said cross-plate, including a pair of dogs carried by the said cross-plate their lower ends to engage the upper portion of the plunger-head, a member carried by and capable of vertical adjustment relative to the said plunger, the peripheral face of which said member when same is moved, will operate the dogs, substantially as described.

18. The combination of a cross-plate carried by the bottom of the plunger, said cross-plate having a central countersunk recess in its bottom and passageways leading into the sides of said recess and adapted to receive water connections, of a hollow plunger-head held in detachable engagement with the said cross plate, said hollow plunger-head having a shoulder top to fit in said countersunk recess, a barrel having its top portion of diameter to fit snugly in the recess therefor in the cross-plate, the body portion of the barrel being of a diameter smaller than that of the bore of the plunger-head, there being perforations through the said barrel, the upper terminals of which perforations will register with the passageways in said cross plate, substantially as and for the purposes set forth.

19. In a machine for making articles of glass, a pressure cylinder, a piston, a mold, yieldable connections between the piston and the plunger, means to cause a release of the cylinder pressure to stop the descent of the piston when the distance between the piston has been reduced to a distance predetermined by the said means.

20. In a machine for making articles of glass, a pressure cylinder, a piston, a mold, a plunger, yieldable connections between the piston and the plunger, means to cause a release of the cylinder pressure to stop the operation of the piston when the distance between the piston and the plunger has been reduced to a distance predetermined by said means, a device to adjust the distance between the plunger and the aforesaid means.

In testimony whereof I have signed my name to this specification in the presence of two subscribing witnesses.

GEORGE E. CLEVELAND.

Witnesses:
 THOMAS L. RYAN,
 ETHEL L. LISTER.